(12) United States Patent
Minarik et al.

(10) Patent No.: US 12,530,268 B2
(45) Date of Patent: Jan. 20, 2026

(54) SELF-HEALING FOR DATA PROTECTION SYSTEMS USING AUTOMATIC MACRO RECORDING AND PLAYBACK

(71) Applicant: Dell Products L.P., Round Rock, TX (US)

(72) Inventors: Jennifer M. Minarik, Zionsville, IN (US); Mark Malamut, Aliso Viejo, CA (US); Brian E. Freeman, Golden, CO (US); Adam Brenner, Mission Viejo, CA (US); Arun Murti, Mission Viejo, CA (US)

(73) Assignee: Dell Products L.P., Round Rock, TX (US)

( * ) Notice: Subject to any disclaimer, the term of this patent is extended or adjusted under 35 U.S.C. 154(b) by 742 days.

(21) Appl. No.: 17/751,344

(22) Filed: May 23, 2022

(65) Prior Publication Data

US 2022/0342779 A1    Oct. 27, 2022

Related U.S. Application Data

(63) Continuation-in-part of application No. 17/237,012, filed on Apr. 21, 2021, now Pat. No. 11,461,218, and a continuation-in-part of application No. 17/236,469, filed on Apr. 21, 2021, now Pat. No. 11,340,968.

(51) Int. Cl.
  *G06F 9/45*   (2006.01)
  *G06F 9/54*   (2006.01)
  *G06F 11/14*  (2006.01)
  *G06F 16/215* (2019.01)

(52) U.S. Cl.
  CPC .......... *G06F 11/1471* (2013.01); *G06F 9/544* (2013.01); *G06F 16/215* (2019.01); *G06F 2201/84* (2013.01)

(58) Field of Classification Search
  CPC .... G06F 9/4443; G06F 9/45512; G06F 9/541; G06F 9/547
  See application file for complete search history.

(56) References Cited

U.S. PATENT DOCUMENTS 11,086,711 B2 *   8/2021   Shwartz .............. G06F 9/45512

* cited by examiner

*Primary Examiner* — Andy Ho
(74) *Attorney, Agent, or Firm* — Staniford Tomita LLP

(57) ABSTRACT

Embodiments for executing selected remediation scripts to remedy issues in a data storage system through an API/script recorder component or process that presents a DVR (digital video recorder)-like interface and capability to capture scripts and API calls as they are used when navigating a graphical user interface (GUI). Internal components of this function perform the recording and macro creation to allow constant playback of these recorded and selected scripts. By easily generating and managing scripts macros, system administrators can easily re-execute customer workflows to apply known fixes to current issues in the data storage system.

15 Claims, 14 Drawing Sheets

400

| ID | TimeStamp | API | Operation | Inputs | Return Code |
|---|---|---|---|---|---|
| 302 | Nov. 22, 2020 | /v2/assets | GET | [1141, 1142] | 200 |

| ID | Name | Value |
|---|---|---|
| 1141 | assetName | InventoryDBServer |
| 1142 | assetType | VM |

| Display Name | Stored Value | Current Value | Runtime Value |
|---|---|---|---|
| UserName | <none> | <hidden> | |
| Device UUID | A493 ... | 783 ... | |
| Pool Name | SQL_PROD | | |

Cancel 511

Launch 512

FIG. 5

| | Issue Attribute 1504 | Remediation Option A: Storage Unit Missing - Typo | Remediation Option B: Storage Unit Missing - Offline | Remediation Option C: Storage Unit Missing - Does Not Exist |
|---|---|---|---|---|
| Overall Affinity Percentage | - | 98% | 55% | 4% |
| Error Code | <code> association with issue | 100% correlation | 60% correlation | 25% correlation |
| Logs Storage Unit | Has this storage unit successfully been used previously in this environment | No | Yes | No |
| Related storage unit name | Does a storage unit exist with a very similar name: yes | Yes | No | No |
| Success % with this issue | -- | 90% (5.323); user sat scores 5/5 (1,234 | 40% (432); User sat scores 4/5 (154) | N/A% (3,421); User sat scores 1/5 (21) |
| Solution 1506 | -- | Series of scripts to restore selected image from the correct storage unit; notification to user of the change | Series of scripts to bring storage unit back online (e.g., power up). If unsuccessful, share documentation and initiate human support | No remediation. Bad restore path selected, user notification of need to choose a valid path |

1500 — ISSUES 1502

FIG. 13

SELF-HEALING FOR DATA PROTECTION SYSTEMS USING AUTOMATIC MACRO RECORDING AND PLAYBACK

CROSS-REFERENCE TO RELATED APPLICATIONS

The present application is a Continuation-In-Part application and claims priority to U.S. patent application Ser. No. 17/237,012 filed on Apr. 21, 2021, entitled "Analyzing User API Usage From Recorded API Macros for Software Product Improvement," which is a Continuation-In-Part of U.S. patent application Ser. No. 17/236,469 filed on Apr. 21, 2021, entitled "Executing Repetitive Custom Workflows Through API Recording and Playback," and assigned to the assignee of the present application.

TECHNICAL FIELD

Embodiments are generally directed to data protection systems, and more specifically to self-healing processes for data manager consoles using API recording and playback.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Large-scale data protection systems, such as cloud data protection systems backup and restore large amounts of data from large numbers of different and disparate backup clients. Established products, such as the PowerProtect Data Manager system from DellEMC provided software defined data protection, automated discovery, deduplication, and IT governance for physical, virtual, and cloud environments. When provided as a business or enterprise platform, such systems may support many clients and customers with different data backup and processing needs. During typical usage deployments, it is common for certain users to encounter problems or issues with data backups or restores. Current troubleshooting of issues within current data protection consoles and systems often requires a user to call technical support personnel to provide guidance or fix these issues. Such a technical support or IT group may maintain a large database of known issues and their corresponding potential solutions.

The solutions or fixes to previously encountered issues are usually provided in the form of command sequences, i.e., macros or scripts, that remedy the problem, such as a sequence of commands to re-run an operation, change a backup target, re-format a disk, and so on. Many such scripts may be provided for a system so that identifying and executing appropriate remedial measures may take excessive amounts of time.

What is needed, therefore, is a system and method that automates the execution of remedial scripts for fixing issues in large-scale data protection systems.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Restorer, and PowerProtect Data Manager are trademarks of Dell EMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

FIG. 4A is a table that illustrates an example data structure and values for ReST based APIs, under an example embodiment.

FIG. 4B is a table containing an input list for the example inputs of FIG. 4A.

FIG. 5 illustrates an example GUI screen for playback of a macro, under some embodiments.

FIG. 13 is a table illustrating an illustrative case of issue affinity across multiple remediation plans, under an example embodiment.

DETAILED DESCRIPTION

Figure 1:
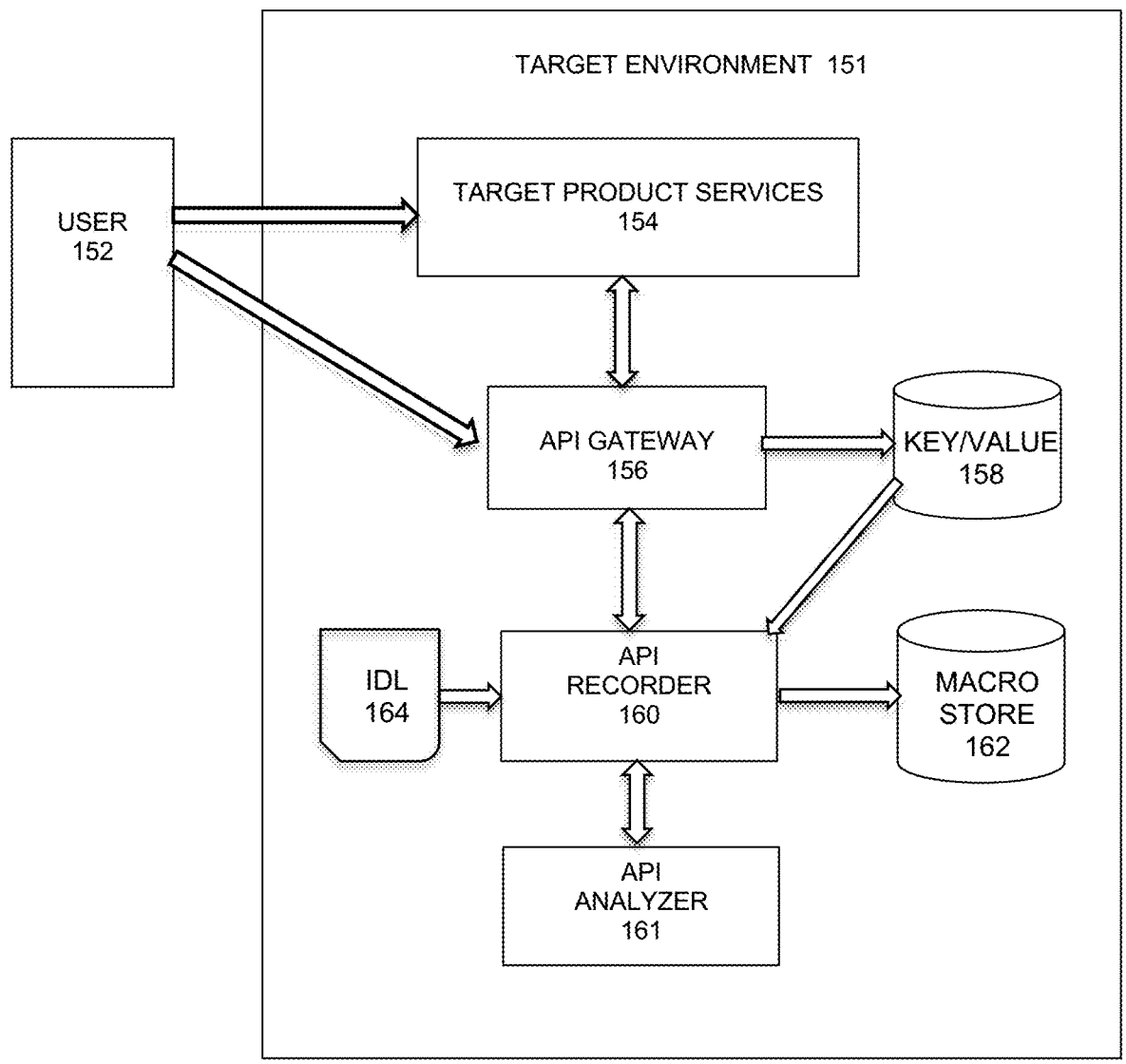
FIG. 1 is a block diagram illustrating an API workflow recorder and playback system and process, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

As stated above, when using a complicated software application such as data protection software, end users will often find a series of steps that need to be repeated many times. Embodiments are directed to a processing component in or associated with a server computer to extend software products to support a simple recorder to accurately and securely record and playback built-in APIs used during the execution of custom workflows. This enables users to easily reuse and share these recorded workflows (referred to herein as 'macros') without the need to manually re-execute multiple steps, nor the need to understand the product internal APIs and deal with development/test issues.

Using an example of checking device logical unit numbers (LUNs) for provisioned versus physical storage size, a user will need to visit multiple interface screens to supply information or code calls to multiple APIs to perform a set of steps such as: (1) specifying the address of target device, entering credentials of target device, (2) retrieving a list of all of the LUNS, (3) getting, for each LUN, the physical and provisioned size, (4) performing a comparison between the sizes using a threshold, and (5) communicating the result to an administrator. If performed through a graphical user interface (GUI), this could require the user to access five or more GUI screens. If this check needs to be performed on a periodic basis, it can be a source of frustration and operator error, such as causing an user to miss a corporate governance violation.

In present systems, such a task is typically coded manually to the API, but understanding the API and writing the code to execute these API calls could take many hours, days or weeks of work. Embodiments include an API recorder function, which presents a DVR (digital video recorder)-like interface and capability to capture API calls as they are used when navigating a GUI. Internal components of this function perform the recording and macro creation to allow constant playback of these recorded API steps. By easily generating and managing macros, system administrators can easily re-execute customer workflows to alleviate frustration and mistakes associated with repetitive and time-consuming input and/or coding operations.

As used herein, the term API means a well-defined software interface that allows other software (either internal or external to the target product) to invoke product specific functionality. An API set is a set of functional interfaces that modern software products typically use to expose their internal functionality. These APIs may be used as tools by other APIs from within a product or, for APIs externally exposed, it enables external products to cause a product to execute functionality. It is a set of routines, and tools for building software applications, and expresses a software component in terms of its operations, inputs, outputs, and underlying types, and defines functionalities that are independent of their respective implementations. This allows definitions and implementations to vary without compromising the interface. APIs often come in the form of a library that includes specifications for routines, data structures, object classes, and variables. An API may also simply be a specification of remote calls exposed to the API consumers, such as SOAP (Simple Object Access Protocol) and ReST (Representational State Transfer) services. Throughout the description and FIGS, the term "API" may be used and should be understood to refer to a remote API or any other remote service.

FIG. 1 is a block diagram illustrating a workflow recorder and playback system and process, under some embodiments. In system 100 of FIG. 1, a target system implements its functionality in target product services 154. Users often access this functionality through a user interface that is part of these target product services. Each internal call between various product services are routed through an API gateway 156. In addition, a user (or another program) may access functionality (but not the UI) directly through the gateway 156. As stated earlier, such vendors often release their own APIs to allow others to design products that can access or utilizes their services. Embodiments include extensions to a target environment's core functionality to support macro recording and playback. Products from the target product services 154 route all API calls through a central contact point such as an API gateway 156.

In general, a macro is a sequence of API calls that a user has identified as desirable to record for later re-execution. In an embodiment, as a separate component/process, an API recorder 160 listens and captures all activity through the gateway 156 which enables recorder 160 to capture all API calls and related information (inputs, outputs and return codes). These API-related values can include any appropriate commands, data elements, and so on, such as the network locations (e.g. URL), payload, and so on. These API values are stored by the API gateway 156 in a key/value store 158. A subset of the values from this key-value store 158 that are related to the APIs that are part of a recorded macro are then used by API recorder 160 to write one or more macros that capture the commands for the API values. These macros are then stored in a macro store 162 to enable playback of these macro as needed and on-demand by the user.

In addition to populating the key/value store 158, the API calls will be executed by API gateway 156 as normal for real-time execution. Upon logout, the key/value data generated during a session will be deleted for security purposes. When macro recording is activated by the user, the gateway 156 will execute commands normally and will set an internal marker or "bookmark" to the first API call in 400 to denote the macro's starting point. Upon the end of a recording session, the API recorder 160 will process the calls and system state in order to create a complete and secure the macro, as described in further detail below. These macros will be stored in a local macro repository 162, and/or alternatively in a public repository.

At any time in the future, a user may begin execution of a macro. Certain items of information (API values) may be changed by the user prior to executing a macro. For example, if the user desires to execute the macro on a different asset they will change the asset runtime value in the macro launch page 500. For this embodiment, the system must ensure that security related information, such as credentials are not stored with macros that are published to a public repository.

Embodiments may also support a library of macros which enables internal sharing with an organization. Additionally, these macros can be examined (securely) by vendors to better understand common customer operations which will enable them to improve their products for the common custom workflows defined by a user or various users.

The API recorder 160 is responsible for recording macros, saving macros, executing macros, managing macros, and storing them in the macro store 162. In addition, it is manages the key value store 158.

For the embodiment of FIG. 1, the API recorder 160 leverages an API call graph of the target product using the target product's Interface Definition Language (IDL) 164, though embodiments are not so limited. An IDL describes the API functions and data inputs and outputs for each function. The API recorder 160 may be deployed as a library or a service within the target product. During normal operation, the API DVR recorder listens for activity on the API gateway 156 will persist every call executed and related data (as shown in FIGS. 4A and 4B below) during a session into the key/value store 158. This includes the API calls and in addition to their inputs. This constitutes their state at any point in time. When macro recording begins, the API recorder 160 will retain a marker into 400 of FIG. 4A until the user stops macro recording, or a timeout or error condition occurs. At that point, the macro will be stored in local store 162 or an external repository. This will encompass all records in 400 from the start marker until the user terminated the recording session.

When macro playback begins, the system will evaluate the current system state, the APIs contained within the macro and the state of the system when the macro was recorded. The API recorder 160 will present the user with relevant API inputs from the macro in addition to those from the currently running system state. The user will be able to choose which value (from stored state or current state) to use, or may manually override an input value to be used.

In general, API functions typically involve a very strict hierarchical ordering of the function calls to be performed. For the example mentioned above, a device discovery process may consist of performing a high-level or root function call that requires no inputs (other than authentication) followed by one or more lower level calls until the desired target operation is executed. The relationships between these function calls generally follows a strict tree-like hierarchy, thus a constrained directed graph can be used to completely describe this hierarchy. A directed graph (called a "call graph") is a set of vertices (or nodes) that are connected together, where all the edges are directed from one vertex to another, as opposed to an undirected graphs, which is a graph where the edges are bidirectional. In this constrained directed graph each graph vertex describes each function call while each graph edge describes how to map the output data from a parent call to the input data into each subsequent child call. In an embodiment, the directed graph represents a graph of function dependencies of a sequence that is performed by a macro executor or other processing component.

In an embodiment, the API recorder uses a call graph of a product's API, which is computed from an Interface Definition Language (IDL) such as a Web Application Description Language (WADL) file in the case of a ReST-based API. A call graph may be created using any appropriate process.

IDL files are used to rigorously define a product's set of APIs, such as Web Application Description Language (WADL) and the OpenAPI Standard (OAS). WADL files define APIs and refer to another file called the XML Schema Definition (XSD) that defines the data types referred to in a WADL. The API recorder 160 uses these IDL files 164 to create an API call graph of the target system. As most APIs require one or more input values and generate one or more output values, an API dependency graph is computed using the IDL. The resulting call graph is a directed graph where each node is an API and connections between nodes are the data inputs/outputs. A parent node is defined as an API whose outputs provide all of the inputs required (or inherit values from their parent APIs) for the child API to execute.

Figure 2:
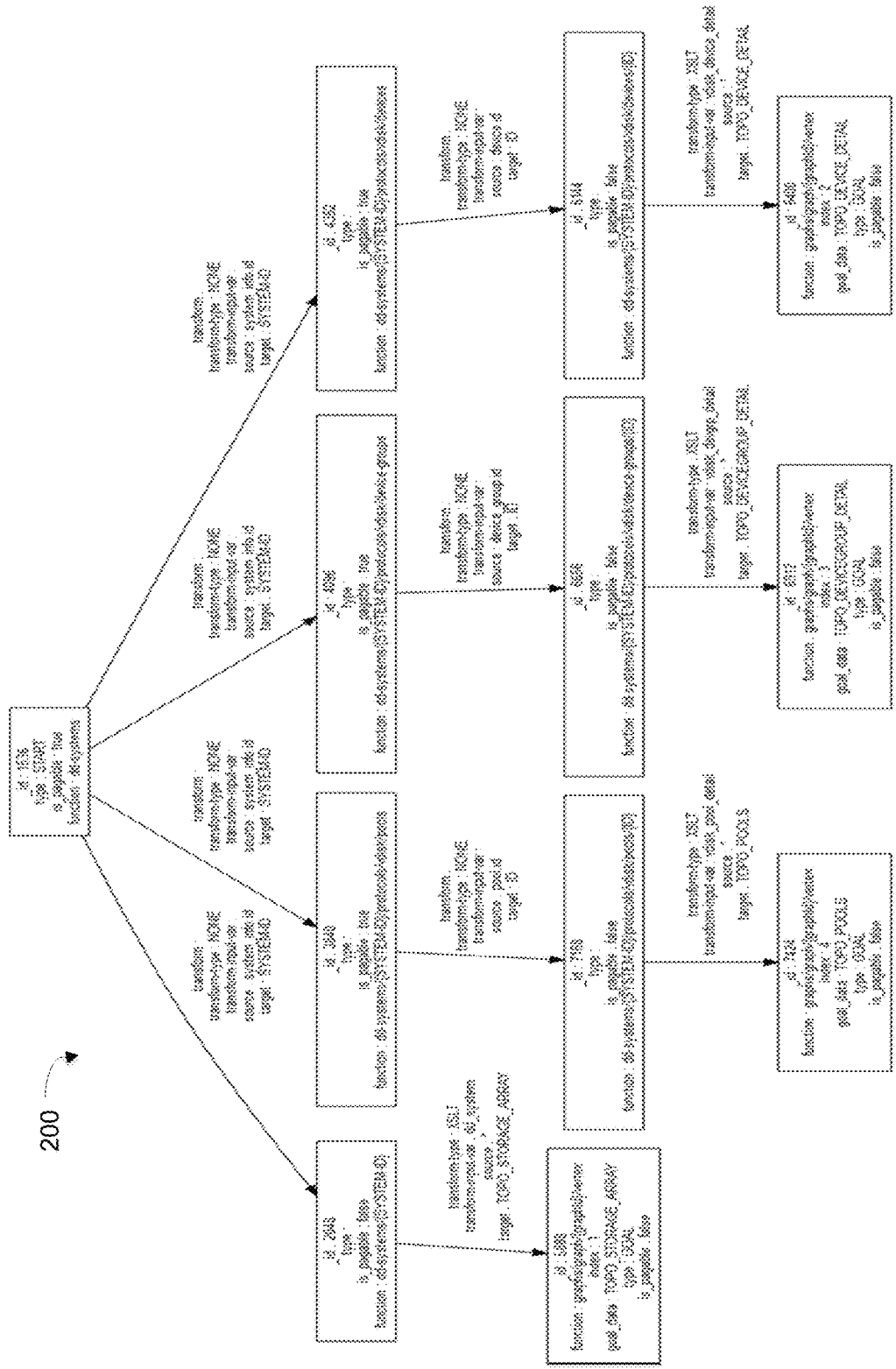
FIG. 2 is a portion of an example call graph from a Dell EMC DataDomain system.

FIG. 2 is a portion of an example call graph from a Dell EMC DataDomain system. Graph 200 of FIG. 2 shows a list of DataDomain ('DD' or 'dd') devices connected to a DDMC, DD disk pools, device groups and devices. In this example, the root API (/dd-systems) returns a list of the connected DD devices. The ID of each DD device is in the ID field of the system_info data structure returned by the call to/dd-systems. This ID is used by the other APIs in order to retrieve the disk pools, devices and device groups for each connected DD. FIG. 2 is an example of a sample call graph for a specific implementation, and is intended only to provide an illustration of a context for operating a API recorder process under some embodiments.

One attribute of the API recorder system 100 is state management, and the API recorder leverages this state management mechanism during macro playback. Before any API can be executed, the target system must be in the correct state. This means that the system must have all of necessary inputs required to call an API. Since the purpose of the API recorder is to allow execution and re-execution of a chain of API calls, the system manages the system state at any point between API calls by automatically passing the required outputs of a parent API as inputs to a child API. If the system is not in the correct state to execute any arbitrary API, API calls are 'walked up' in the chain via the API call graph. By walking up the API call graph, the system is able to identify and execute the first API call necessary (and subsequent API calls if needed) that must be executed to place the system in the correct state so that any arbitrary API can execute successfully.

Figure 3:
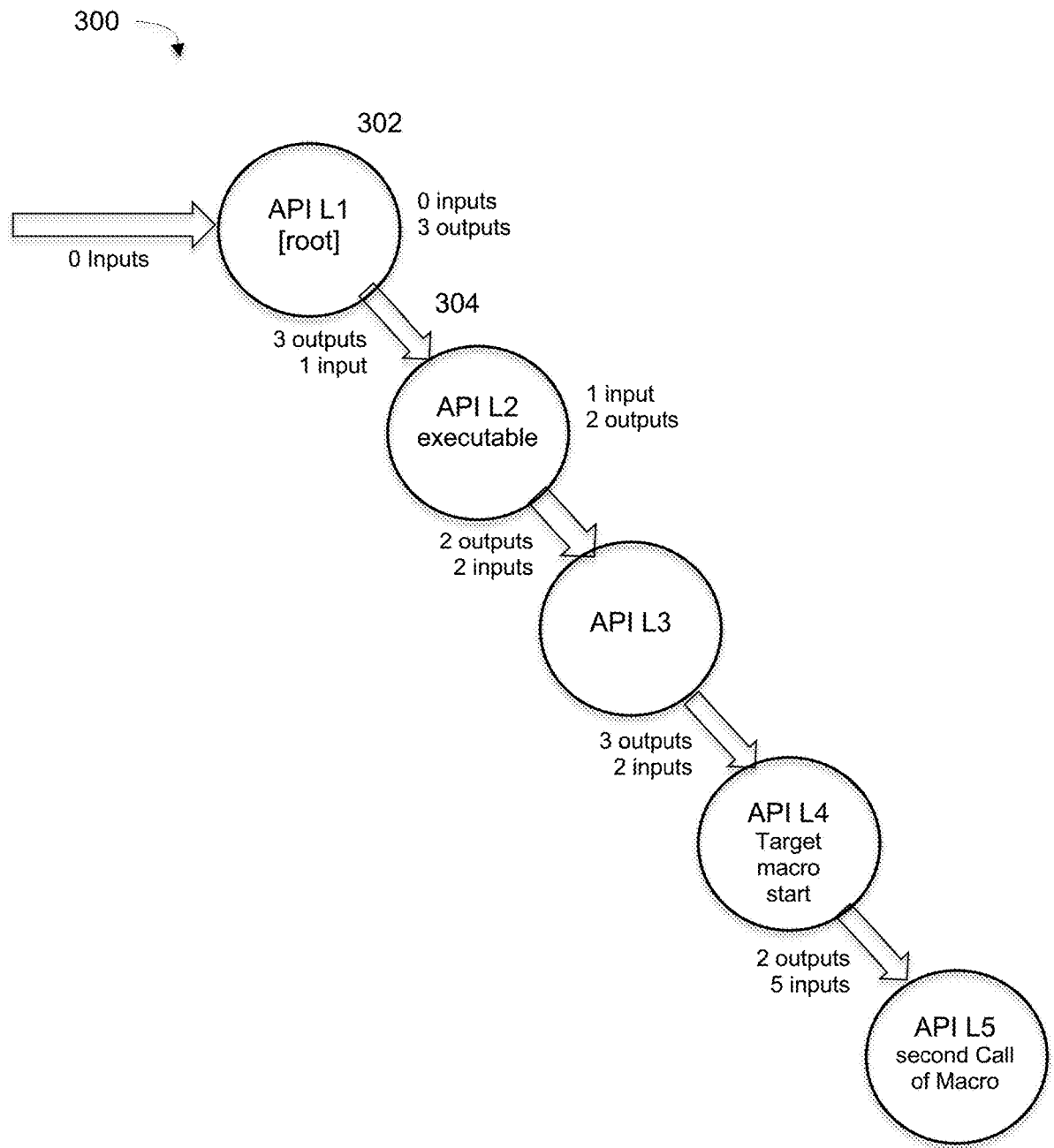
FIG. 3 is diagram illustrating an example path of a target API call, such as used for an API recorder in an example embodiment.

FIG. 3 is diagram illustrating an example path of a target API call. Each API will require zero or more inputs and generate zero or more outputs. APIs that require no (zero) inputs are considered a root API call. The inputs to any API may not require all of the parent outputs as inputs may be satisfied from the output of another API or the systems current running state. The example API call graph 300 of FIG. 3 shows five APIs 302 denoted API L1, API L2, API L3, API L4, and API L5. The APLs are connected to one another sequentially through a series of input/output links 304. The example of FIG. 3 shown a single chain API graph where the APIs 302 are linked through one strand of input/output links. The chain may be more complicated by the addition of other APIs that branch into or out of any of the APIs (e.g., FIG. 2), but for ease of illustration, only a single chain is shown. APL L1 has The following shows an annotated single chain through an APIs call graph.

In API graph 300, API L1 is a root API with zero inputs. API L1 thus has 0 inputs, as well as three outputs, as shown. API L2 uses only one of these three inputs so only that input is passed from L1 to L2, and so on down through the chain. For the example of FIG. 3, assume that a macro (Macro A) begins at API L4 (target API of Macro A), which also contains API L5 in addition to possibly other APIs. When macro execution begins, the API recorder 160 recognizes which inputs are required from all APIs in the macro that are not part of the macro parent/child call chain. These inputs can be satisfied in one of four ways: 1) they can be held in the current system running states key/value store (identified as Current Value in FIG. 5); 2) they can come from the values that were persisted along with the macro at the time of macro creation (identified as Stored Value in FIG. 5); 3) they can be overridden by the user entering a new value (identified as Runtime value in FIG. 5); or 4) for values not supplied the system can attempt to obtain these values by walking up the call tree and executing APIs that were outside of the stored macro that can generate these missing values. Note that not every value will be resolvable by the fourth method, in which case a warning will be presented to the user so that they can supply inputs for values that are not resolvable.

The key/value store 158 is configured to hold each API call executed. FIG. 4A is a table that illustrates an example data structure and values for ReST based APIs, under an example embodiment. As shown for table 400 of FIG. 4A, the key/value store will retain data in the following format: ID, TimeStamp, API, Operation, Inputs, and Return Code. The illustrated values provide illustration of certain example table entries. The ID field is an internally assigned ID, the TimeStamp specified when the API call completed execution, the API field specifies the target product API that is invoked, the Operation field lists the ReST operation (e.g., GET, PUT, POST, etc.), the Input field lists the values supplied to the API, and the Return Code provides the ReST return code.

The Input field provides an input list that is a list of IDs persisted such as [1141, 1142]. FIG. 4B is a table containing an input list for the example Inputs of FIG. 4A. As shown for table 410, the input list has fields for the ID, Name, and Value, with example values shown in FIG. 4B for Input IDs 1141 and 1142 from table 400. FIGS. 4A and 4B provide example data structures and example entries for ReST APIs, but embodiments are not so limited. Similar tables and data values can be used for other API types, as appropriate.

With respect to recording a macro, the API recorder will capture all of the API calls that are invoked as a consequence of selections and inputs performed by the user and the API outputs. As an example for ReST-based APIs, this will include recording the URL, any payload, return document (such as XML or JSON), and the HTTP return code. Upon termination of a recording session, the API recorder will ask the user for a location where all the macro will be stored. Once the API calls and payloads have been processed, the macro will be stored.

For recording, as a user interacts with a software system, they may decide that a series of steps will be repeated and therefore will want to create a macro. The user will identify the start of these steps by invoking a Start Macro command in the GUI. They will then interact with the software system as desired. When they have executed the final operation that they want to save in a macro, they can execute a Stop Macro command. Internally the system will retain the ID (startMacroID) of the first API called after the Start Macro command. Upon the Stop Macro command, the system will evaluate and analyze the API calls executed from the StartMacroID to the last API executed, and upon completion of this analysis, the macro will be persisted in the macro store 162. During the analysis phase, the IDL will be analyzed for each API in the macro to determine which inputs (e.g., those marked security="secret") will not be persisted in the macro store. APIs within the macro that did not generate a successful return code will also not be persisted to a macro. The final step in the macro recording will be to store the APIs and inputs using the data structures shown above into the macro store.

In an embodiment, certain conditions or state restrictions may need to be satisfied for an API sequence to be recorded as a macro. For example, in order to completely and securely process a macro, a product must support at least two key capabilities. The first is a method of removing sensitive information so that macros can be freely shared. The second is a mechanism to store information in order to put the system in a state that is similar to the state of when the macro recording began. This is the state required to enable the entire macro to execute.

With respect to sensitive information, certain data items should never be stored in a macro file due to security considerations, while other data items may be stored and marked for optional replacement during playback. For example, some items may be tagged as being secret (e.g., usernames, passwords, etc.) to denote they will not be placed in a macro as doing so would be a security violation. Other data items may be tagged as being local (e.g., UUIDs, serial numbers, etc.) as they may or may not be relevant during playback dependent upon the playback environment. Other data items may be sensitive given the nature of the software product, application, and so on. For example, medical applications require certain patient data fields to be kept secret, likewise for legal applications, and so on. This sensitivity tagging can be accomplished by extending the product API definition (IDL) to appropriately mark certain data items.

When a macro is being stored the system will suppress storing of default or tagged secret items.

The following program code example shows a modified version of a product IDL (specifically the XSD) that would be used by the API DVR where 'xs' element items are extended with the tag security and optionally a secondary tag 'displayName' that will be the user friendly name presented to a user in the Launch page (e.g., FIG. 5) for inputting its corresponding value.

```
<xs:complexType name="authInfo">
    <xs:sequence>
        <xs:element name="username" type="xs:string" security="secret" displayName="User Name"/>
        <xs:element name="password" type="xs:string"security="secret"/
    </xs:sequence>
</xs:complexType>
<xs:complexType name="systemInfoDetail">
    <xs:sequence>
        <xs:element name="name" type="xs:string"/>
        <xs:element name="version" type="xs:string" minOccurs="0"/>
        <xs:element name="serialno" type="xs:string" minOccurs="0" security="local" displayName="DataDomain Serial Number"/>
        <xs:element name="model" type="xs:string" minOccurs="0"/>
        <xs:element name="uptime" type="xs:string" minOccurs="0"/>
        <xs:element name="uptime_secs" type="xs:unsignedLong" minOccurs="0"/>
        <xs:element name="uuid" type="xs:string" minOccurs="0" security="local"/>
        <xs:element name="link" type="dd:restLinkRep" minOccurs="0"/>
    </xs:sequence>
</xs:complexType>
```

For XSD files, as exemplified above, the API recorder will analyze XSD files and perform custom processing for xs:element items for the extension tags specific to the API recorder. The security tag can take on a value of 'secret' for secure data (such as a username or password) or local (such as a device serial number or uuid) for data that is local to a running instance of a system that may not be globally relevant. Data items tagged security="secret" will not be persisted.

During the entirety of a user session, all of the results of each API call will be preserved in a session cache regardless of the macro record mode. Should a user begin and end a macro recording session, the values in this cache that are needed for macro execution will be stored in the macro. Specifically, each stored API call in the macro will have all required input values set from values in this cache as necessary for each API. This will allow the macro to execute.

With respect to macro playback, in order to support playback, the API recorder requires an API call tree of the target product. This may be done by the vendor running a process while building the software and the resulting tree may be embedded within the software. Alternatively, the vendor may simply publish the IDL and the API DVR can compute this call tree at any time.

As shown in the example of FIG. 3, the API call tree is a graph where each node is an API call and the edges are inputs (for incoming edges) or outputs (for outgoing edges). Each edge connects to another API which may be a parent API or child API. A parent API generates outputs that are consumed as an input to an API. Note that not every parent output will be used as an input to the child and some APIs may have no inputs (known as a root API) or no outputs (a terminal API).

When the user chooses to playback a macro, the macro playback page is presented. This shows all the inputs that are required by every API from within the macro that are not satisfied by outputs of another API within the macro. The value that existed when the macro was recorded is shown along with the value in the current running system (if any). The user may select a stored value or current value which will copy it to the runtime value and/or enter/input a runtime value. Upon launch, the macro playback mechanism will only use the values from the Runtime Value column.

FIG. 5 illustrates an example GUI screen for playback of a macro, under some embodiments. Table 510 of FIG. 5 lists the relevant API display names, stored/current values and runtime values for launch 512 (or cancellation 511) through the appropriate GUI command buttons.

Upon launch 512, the macro and the runtime values must be evaluated prior to macro execution. If a value was deleted (e.g., the user chose to remove a runtime value), then the playback system must determine how to obtain this value. Only once it has done so for all missing values can execution begin. In order to get these values, the system will analyze the call tree. First the call tree for the APIs in the macro are evaluated. The playback mechanism determines which API within the macro requires the missing value. If a parent API can be identified that generates all of the missing values, the macro can begin from its starting point. As described above, this is a matter of walking up the call tree from parent to parent until an output is found that matches the required missing input. If, however, a parent API cannot be found within the macro, then the entire target system call tree must be evaluated. The same technique of walking up the call tree is performed (except it is not limited to the APIs within the macro), and when the required API is found, it is marked as the start of the macro for this launch. Note that each launch may have a different starting point depending on the runtime values that were deleted by the user. When the new start point is determined, a secondary analysis must be performed. This follows the same process (show launch window and perform analysis) except now more inputs will be shown that encompass the APIs from the new start point to the stored macro start point. If the user has set the conditions such that the system cannot satisfy them, a macro failure message will be presented and the macro will not execute.

As discussed above, during normal operation of the target system, the API gateway will persist all APIs executed, their inputs (e.g., payload) and return codes. When recording is initiated, the system may be in a non-default state as the user may have already performed a series of operations. As macro recording may begin from any arbitrary state, the playback system must insure the system is in the correct state prior to macro playback. In order to be placed in the correct state, the playback system will examine the APIs to be called in the macro and the data items that it has persisted from the current session. If data items are missing, then ancestor APIs will be called automatically to obtain the necessary data. The ancestor calls are identified by walking up the API call graph. When a macro playback is initiated, the user will be presented with the inputs to all the APIs that will be called along with the names/values that were obtained from the cache at the time of recording. This will enable the user supply their own values for any of stored inputs. Some values such as those with the security tag value of secret will be need to be obtained from the current session cache or from the user in real-time while those tagged as local will be highlighted in the macro initiate UI. When values from a current running session are duplicates of values stored in a macro, both will be shown.

Figure 6:
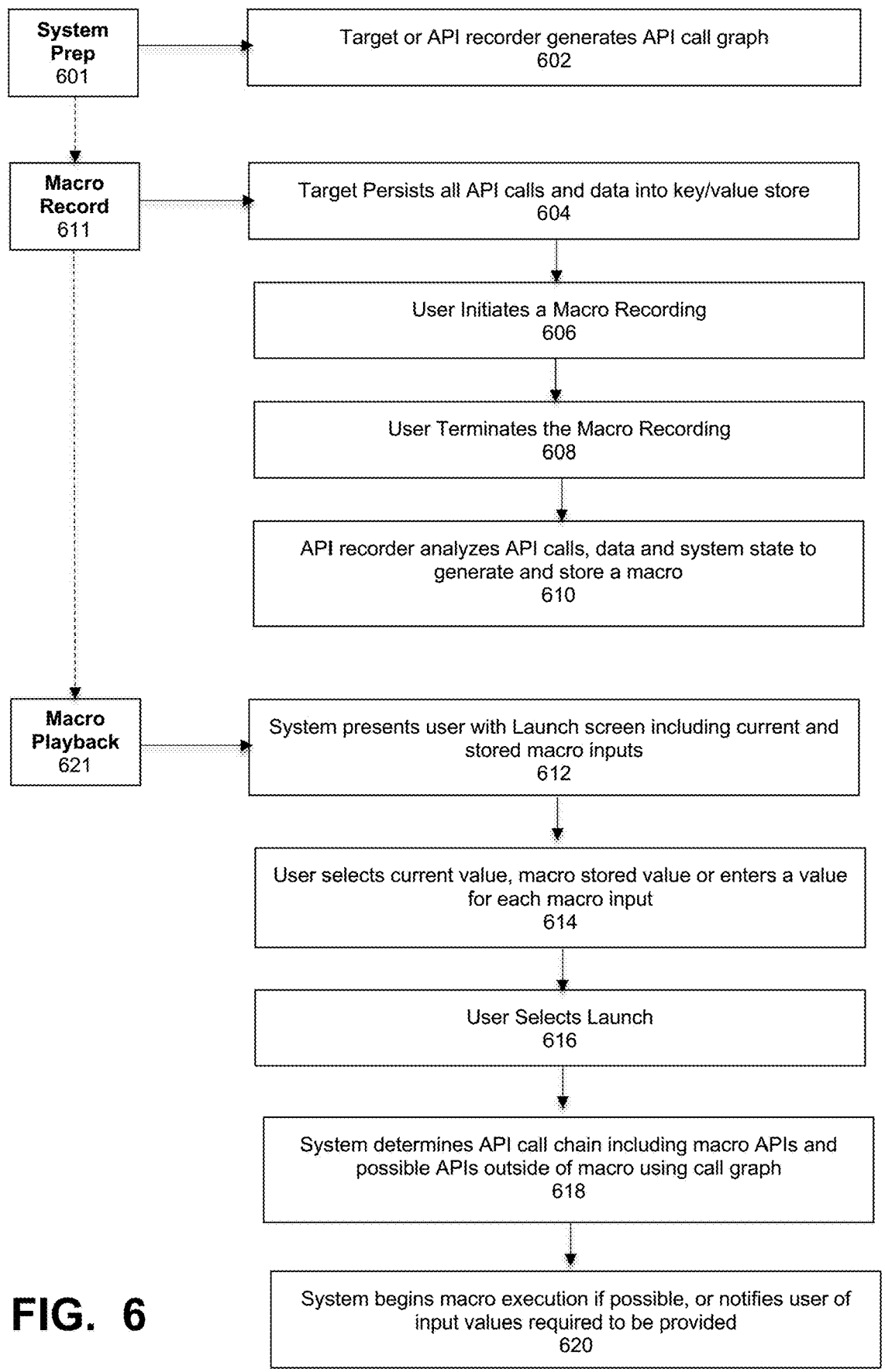
FIG. 6 is a flowchart that illustrates an overall method of recording and playing back API macros, under some embodiments.

FIG. 6 is a flowchart that illustrates an overall method of recording and playing back API macros, under some embodiments. The overall method of FIG. 6 includes three main phases of system preparation 601, macro recording, 611, and macro playback 621, each of which includes certain sub-processes or sub-steps. The system preparation phase 601 starts with the target system or API recorder generating an API call graph, 602. After this preparation phase, the macro record phase 611 begins with the target persisting all API calls and data into the key/value store, 604. The user then initiates a macro recording to record the desired operation sequence of the API, 606. After desired operations are recorded, the user terminates the macro recording, 608. The API recorder analyzes the API calls, data and system state to generate and store the recorded macro, 610.

A recorded macro can be played back at any time in the macro playback phase 621. This phase begins with the system presenting the user with a launch screen (e.g., FIG. 5) including current and stored macro inputs, 612. This allows the user to input appropriate values for the macro. The user can select a current value, a macro stored value, or an specific entered value for each macro input, 614. The user then selects the launch command, 616. Upon launch, the system determines the API call chain including macro APIs and possible APIs outside of the macro using the call graph, 681. The system then begins macro execution if possible, or notifies the user of any further or different input values that need to be provided, 620.

The recorded APIs may be published for later analysis and commercialization, where appropriate. With regard to saving and publishing a macro, when a macro record session is terminated, the user can store the macro to a variety of targets. A local storage is used when a macro is stored locally to an end user's local storage. This is intended for macros that are only used by the user or as a sandbox (temporary local storage) during development. Another macro repository is a private macro library, which central location private to an organization such as an NFS mount point or a private git instance may be created by an administrator. This will be a shared repository for macros that can be shared across an organization. A public macro library may be used in certain cases. Using a central repository such as a public git instance, users may publish macros that can be used by anyone. For macros that are sufficiently complex, macros may be put up for sale so that developers can be compensated for making complex macros available. In addition, vendors that have incorporated the API recorder into their software may have free access to any public macro that was generated by their software. Evaluating macro contents and their downloads counts can provide vendors insights as to how customers would like to see their product extended and look for "hot spots" where certain API calls are commonly invoked.

Embodiments thus provide a macro recording and playback that analyzes API call graphs and automatically executes ancestor APIs. This macro record/playback subsystem enables users to automatically generate macros that can be saved, shared and played back at any point in time. They may be shared within an organization or across different organizations. As described in further detail below, users and vendors may analyze public macros in order to understand repetitive workflows and potentially add core capabilities or find new features that can be offered to their customers. The system uses custom tagging of an IDL to define the security level of any data item. It also analyzes initial conditions and automatically calls ancestor APIs as required without user intervention. Such a system can ultimately be used to support vendor analysis for product improvement, and even to help create a marketplace for macros.

API Macro Usage Analysis

The above-described method is directed to automatically capturing the history of APIs executed by a customer and allowing customers to define macros that consist of a series of API calls. As stated above, a macro is essentially a series of API calls that a user has deemed important enough to preserve as a single workflow, as users expect to execute the same set of steps repeatedly.

The API recorder system 100 also allows for analysis of many sets of recorded macros. There is a significant advantage to the software vendor in supporting this capability. It allows the analysis of the macros that have been published and improve their product. As an example, consider the case where 1000 macros have been published. These macros can be evaluated to find which sets of API calls are commonly grouped together as a macro. If there is a high enough frequency of a set of API calls within the published macros, the vendor could improve their product by creating a new functionality to be incorporated in a future release where a smaller set (single) of UI screens would be required to accomplish the functionality of these common macros. This will reduce the effort on customers (and potentially reduce user errors) to accomplish these common procedures.

In an embodiment, the API macro recorder system 100 is extended through a macro analyzer component/function 161 to allow vendors to leverage actual product usage data for product improvements. Analyzing API usage across a universe of customers can enable vendors to better understand exactly how their products are used. By capturing API execution information such as APIs used, APIs within macros, API return codes and API execution times (which will require table 400 to persist startTime and endTime as opposed to a single timestamp), analysis tools can be run by the vendor to gain a deeper insight into product usage such as which APIs that are important (heavily used) and areas of the product that can be improved.

The analysis function 161 also enables users (both customers and vendors) to view critical operational information, such as APIs that often result in errors or have a long runtime. These are two examples of product deficiencies that typically cause the highest level of customer frustration. Using these, and other similar metrics, vendors can gain insight about areas of the product that need or do not need attention, or even areas that potentially may be deprecated. This analysis function thus provides deeper understanding regarding product usage to assist vendors in deciding upon product improvements using measurable data.

Figure 7:
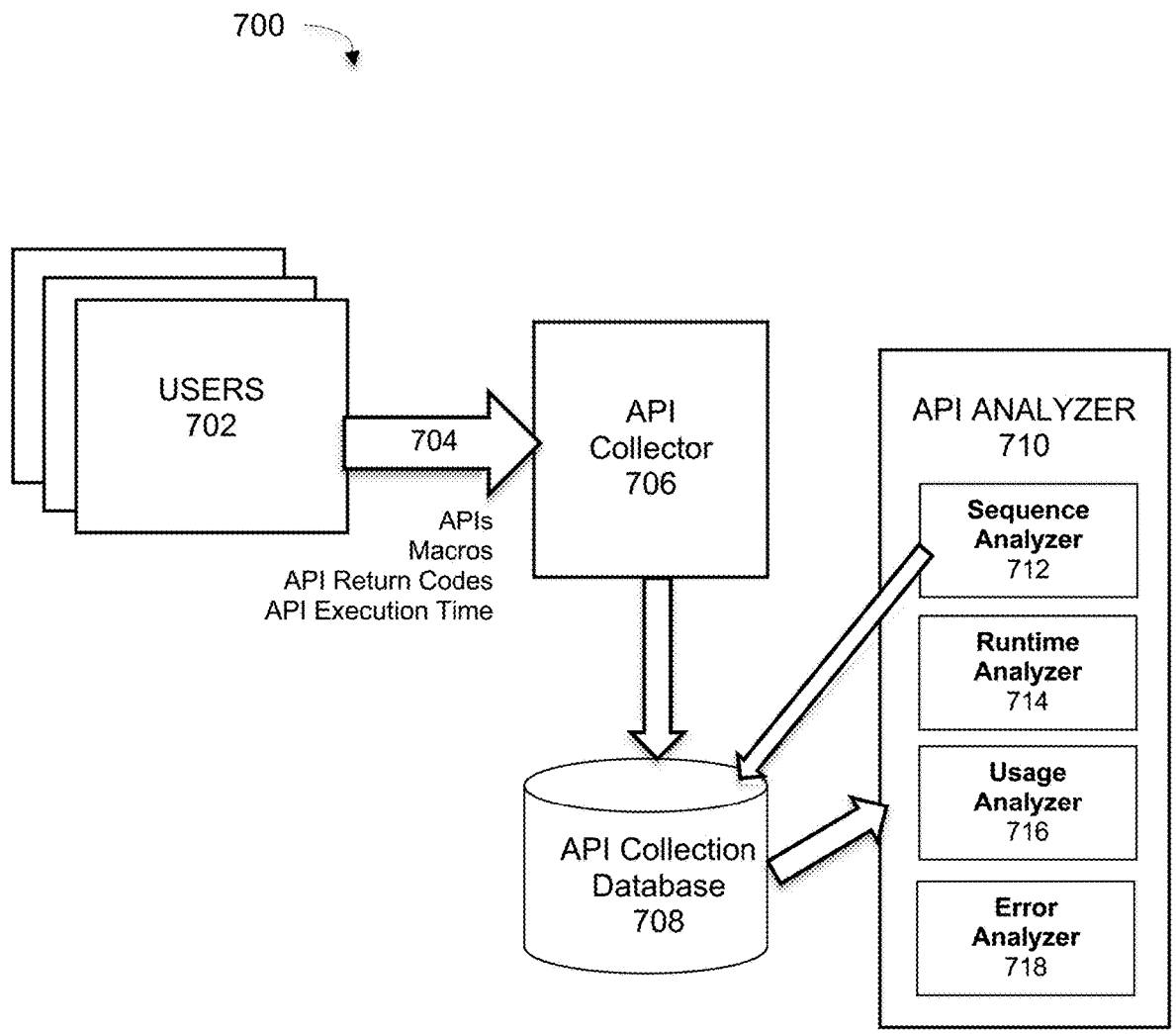
FIG. 7 is a block diagram illustrating an API analyzer component for use with an API macro recorder, under some embodiments.

FIG. 7 is a block diagram illustrating an API analyzer component for use with an API macro recorder, under some embodiments. System 700 illustrates some of the functional components within the API analyzer component 161 of FIG. 1. As shown in FIG. 7, the main components of the analyzer component include an API collector 706, an API collection database 708, and an API analyzer component 710.

The API collector 706 collects API data 704 from a number of users (or multiple use by a single user). The data may be collected over a defined period of time, or for a volume of API usage at a specific time, or any combination thereof. Relevant factors for the API collector, such as number and identity of users, number and type of APIs, collection period, and so on may be defined by the user as needed. The user API data 704 comprises the API calls, macros (series of APIs), API return codes, and the execution time of the APIs. Other data items may also be included depending on the type of analysis being conducted.

The API collector 706 outputs the collected API data 704 to an API collection database 708. This data is then provided to and used by API analyzer 710. For the embodiment of FIG. 7, the analysis performed by the analyzer 710 uses a series of separate API analyzer components that will examine API usage across the pool of users 702, and that include a sequence analyzer 712, a runtime analyzer 714, a usage frequency analyzer 716, and an error analyzer 718. Additional (or different) analyzers may be supported, including the ability to define and add custom analyzers.

Typically, the analysis process is performed by a software product vendor who can run any of the specific analyzers, depending on their needs. Each analyzer component will evaluate single APIs, detected API sequences (synthetic macros) and APIs within a macro for various attributes such as frequency, runtime speed and API errors.

The sequence analyzer 712 is the first analyzer to execute. Its purpose is to identify APIs that are often called in succession. These API series are referred to as 'synthetic macros,' which are nearly identical to a macro. While many of these may be part of an expected workflow, others may not be. These synthetic macros are stored in the database 708 and processed by the other analyzer components in a manner nearly identically to a user defined macro.

The next analyzer component is the runtime analyzer 714, which computes the execution run times for APIs and macros. Successful long-running APIs and macros will be identified and flagged. Vendors viewing this information can decide which APIs/macros are taking too long and consider optimizations based upon domain knowledge of the actions being taken.

The usage frequency analyzer 716 allows a vendor to see information such as the number of times an API and API macros (including synthetic macros) are executed. Those APIs/macros with lower total execution counts are potential APIs for deprecation, while APIs and macros (including synthetic) with higher counts are candidates for evaluation and improvement. This could include creating a single, more efficient API, an enhanced UI or re-evaluation of a workflow that may warrant a product redesign.

During operation, each API generates a return code, and APIs that have a high frequency of error return codes are problematic. The error analyzer 718 evaluates the collected APIs by looking at the return code and determining if prechecks and/or other remediation can reduce the number of errors generated. Macros can be evaluated in a similar manner.

Figure 8:
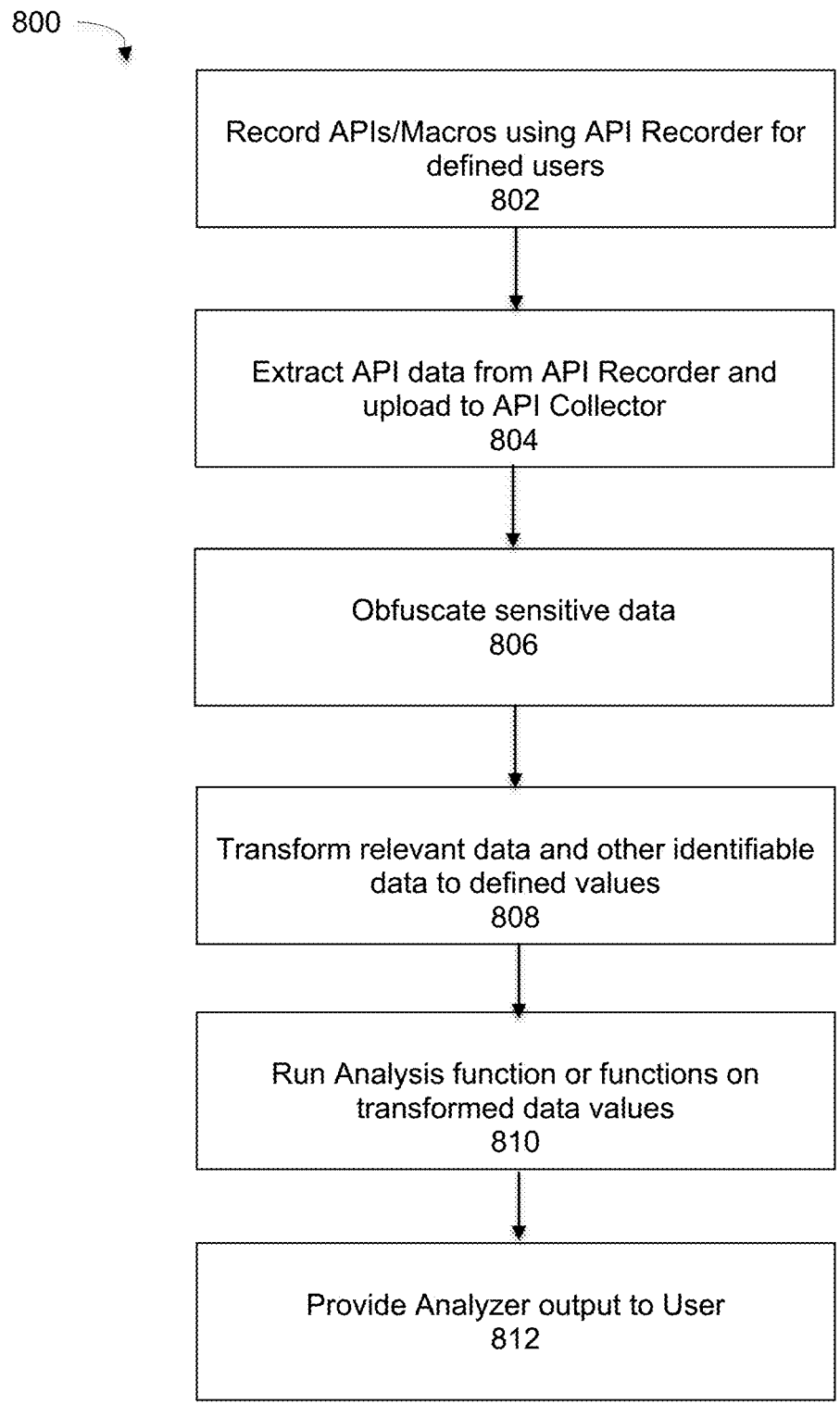
FIG. 8 is a flowchart illustrating a method of performing API analysis, under some embodiments.

As a product development tool, vendors or other users may opt-in to API data collection and/or use the analysis functions as they are required. FIG. 8 illustrates data flows from user environments 702 to the vendor in order to support API analysis. As shown in process 800 of FIG. 8, APIs and/or API macros are recorded for a defined group of users 702 using the API recorder described above. On a periodic basis, such as during a standard existing telemetry upload process, the relevant API data 704 is extracted from the API recorder 160 and uploaded to the API collector 706, step 804. It should be noted that to protect customers from governance, security and privacy (e.g., GDPR) concerns, the customer identifiable parameters will be obfuscated, 806. In order to preserve context, parameters such as IDs, GUIDs, serial numbers, and so on, are converted into different defined values. For purposes of API operational analysis, the most important attribute is the consistency of parameters (e.g., parameter 3 in API #5 is passed as parameter 2 to API #6). Other identifiable information will be transformed in a similar manner. The mechanism described above for specifying parameter sensitivity can be used to obfuscate any sensitive data before it leaves the users' premises.

The process then performs all or any selected analyzer function (i.e., sequence, runtime, usage frequency, and error) on the transformed data, 810. The system then provides the analyzer 710 results to the user, step 812. The user or vendor can then generate appropriate reports, apply analysis tools and perform manual or automated analysis on the analyzer output to evaluate the operation of their APIs/macros.

Self-Healing Process for Data Protection Systems

Embodiments are further used to implement timely and automatic execution of command sequences or scripts that fix issues encountered during data protection operations. In present systems, fixing user issues in present large-scale data protection systems can often require extensive person-to-person interaction between users and tech support personnel. Embodiments reduce the need for such manual and human-based interaction by providing a data protection console that is itself directly connected to a support remediation knowledge database so that it an leverage a wide range of current console metrics to identify reasons for an issue. Once a source of the issue has been identified, automated script execution processes implement the proposed fix by generating and running scripts within the user environment to perform self-healing of the system. The script is executed by the API recorder method described above.

Figure 9:
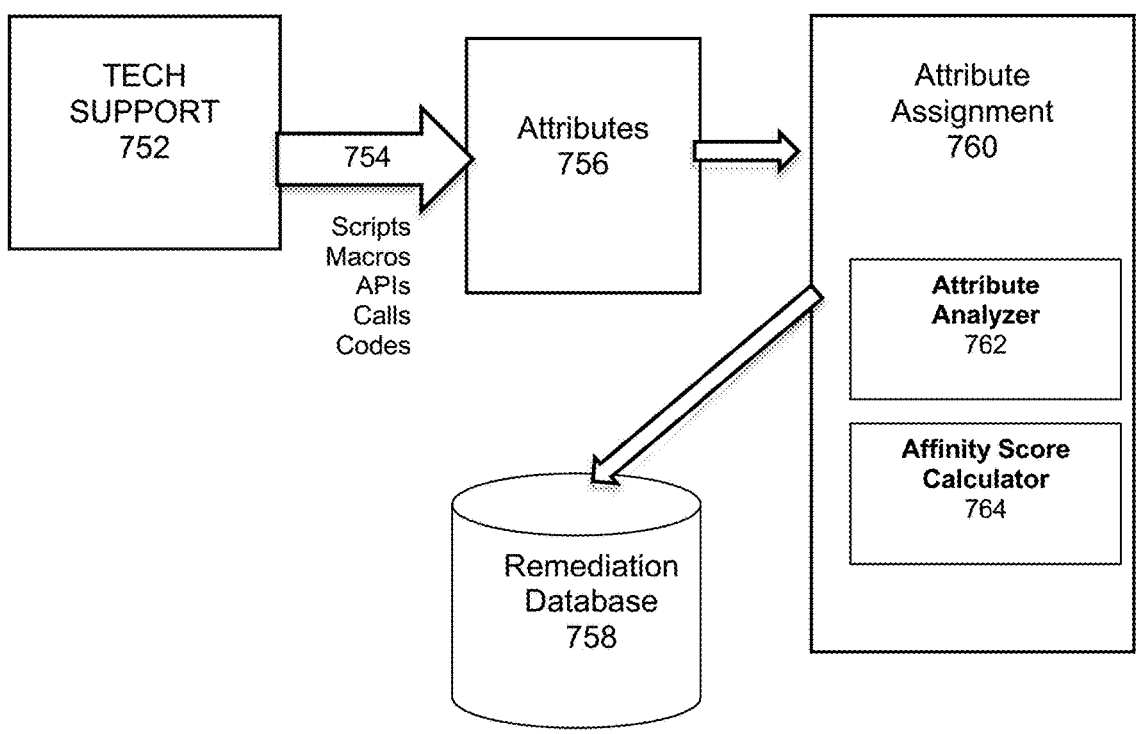
FIG. 9 is a block diagram illustrating an self-healing analyzer component for use with an script macro recorder, under some embodiments.

FIG. 9 is a block diagram illustrating a script/macro recorder for use with a self-healing analyzer component, under some embodiments. For purposes of description, the term 'script' refers to a set of commands that are executed in sequence to perform a task, and as described above, the term 'macro' refers to a sequence of API calls that may be recorded for later re-execution. It should be noted that these terms may be used interchangeably to refer to any sequence of commands, codes, instructions, and so on, that are executed by the processor-based system to perform a function, and that may be recorded for later or repeated automated execution.

As shown in system 900, scripts, macros, etc. 754 are generated by technical support staff 752, historical usage logs, or other similar users or sources. Such scripts remedy or fix detected issues in the backup system and are selected from among a database of known and stored fixes by an analysis process described in greater detail below. Each script/macro (and likewise each operation) has a set of attributes that are affected. An attribute analyzer processes these attributes for relevancy, and a remediation database 758 stores these attributes with each script/macro and also stores the attributes with each operation. An affinity score calculator 764 calculates an overall affinity score for the present script versus previously stored scripts using the number of attributes in common between any operation and all of the stored scripts/macros. The script/macro with the highest affinity score will be executed in an attempt to fix the environment so that the operation can be executed successfully.

The remediation database 758 has an entry for each remediation script that includes a list of attributes that the script affects. Each system has a list of attributes associated with each operation. When an operation fails, the system tries to find the best script to remedy the problem. It does so by computing an affinity score for each script. The affinity score is calculated 764 by looking at the number of attributes associated with the operation and comparing those attributes with each script in the remediation database. For example: if an operation requires A, B, X and Q any script that has only has A, B, X and Q will have a 100% affinity score. Scripts that have more or less attributes or different attributes would have a lower score. An example of an operation will be: create an Mtree on DataDomain, create a user PPDM and perform a backup in PPDM. A remediation script could be an operation such as: format a disk drive, reconnect an LDAP server or reset a VM, and so on.

For this embodiment, the API recorder system and processes described above are extended to automatically substitute unique user information (e.g., System UUIDs) to automatically customize solutions for the issues in the user environment. For example, this could be as simple as restarting a stalled job or more complex actions such as resetting an attribute before restarting a backup again. The API recorder allows tech support 752 to record a macro of the solution activities while also maintaining the appropriate substitution variables at run time (e.g., asset ID, target storage ID, etc.). The API recorder system described above presents the user with certain variables to be substituted and applies to macros captured by the recorder. Embodiments of system 900 apply to scripts or macros that provide similar variable substitutions to perform issue remediation in data protection systems.

Figure 10:
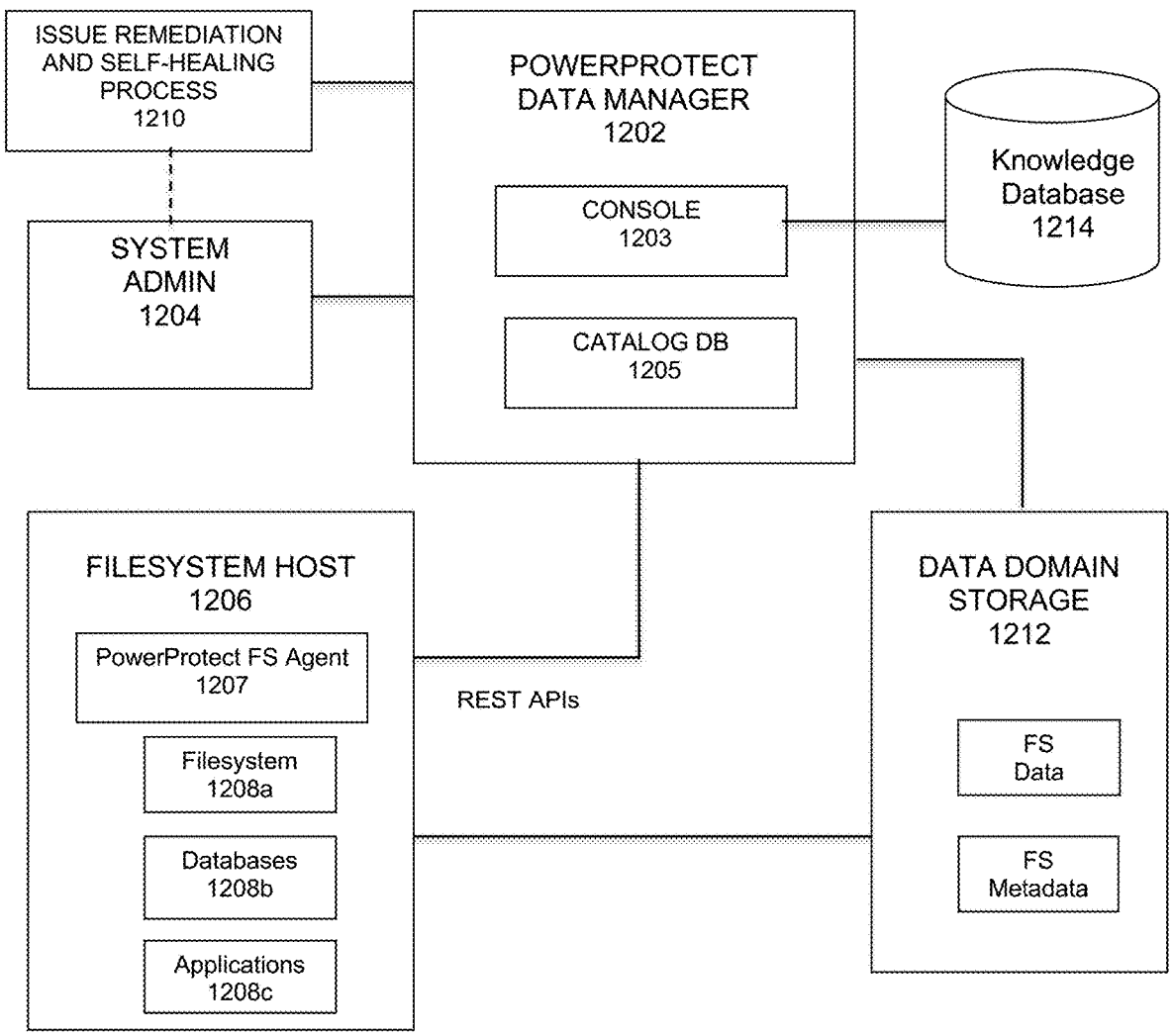
FIG. 10 illustrates a PowerProtect data manager system that implements a self-healing process, under some embodiments.

FIG. 10 illustrates a PowerProtect data manager system that implements a self-healing process, under some embodiments. In system 1200, the data manager component 1202 provides ability to discover, manage, monitor data protection and replication for filesystem assets, such as provided or accessed by filesystem host 1206 through integration the file system agent 1207. Filesystem assets, such as filesystems 1208a, databases 1208b, applications 1208c, and any other relevant data are protected in with system with centralized and self-service file system protection features. The data manager 1202 enables a user, such as system (or IT) admin staff 1204 to perform backup and restore using certain self-service CLI (command line interface) workflows for Windows and Linux (or similar) assets.

Data is backed up from and restored to the data sources from storage (e.g., Data Domain appliances) 1212, which stores filesystem data and metadata. The data manager is configured to support various levels of data backups, such as block-based and file-based filesystem support for different operating systems, e.g., Windows (NTFS, ReFS) and Linux (Ext3, Ext4 and XFS), etc. It also provides centralized filesystem backup and recovery (volume and file level), as well as centralized file level restores of block-based file system backups.

In an embodiment, the data manager 1202 provides a console 1206 including a graphical user interface (GUI) component that allows users to set protection policies, perform backup and recovery operations, deduplicate workloads and file systems, and so on. Filesystem backup configuration can be done by a backup administrator 1204 through protection lifecycle policies set on the data manager 1202. At the time of a scheduled backup, the data manager 202 requests the filesystem agent 1207 to perform a save operation for filesystem data. The filesystem agent parses the backup job request and converts the request into appropriate (e.g., ddfssv) utility commands and performs the save operation. The filesystem agent 1207 creates/verifies the storage unit on the storage media 1212. Upon successful verification, the filesystem agent writes the file system data directly to the storage unit and sends the catalog details to catalog database 1205 in the data manager 1202. Other operations, such as data restores, replication, and so on, can be performed similarly in system 1200.

The data manager system can be deployed as a stand-alone system, integrated appliance form factor, or in an Amazon Web Services (AWS) or similar system to protect in-cloud workloads. It can be configured to protect a variety of databases, Kubernetes container environments, VMware applications on-premises and in the cloud, as well as Windows NTFS and Linux filesystems. Although embodiments are described with respect to a Dell EMC PowerProtect Data Manager system, it should be noted embodiments are not so limited, and any similar data protection system may be used.

As stated above, any issues that arise with respect to data backup, restores, or other processing operations must typically be manually handled by the user and/or system administrator 1204 through some form of personal interaction. For the embodiment of FIG. 10, system 1200 includes an issue remediation and self-healing process 1210 that provides a direct interface between the console 1203 and a support remediation knowledge database 1214 that allows the data manager 1202 to leverage a wide range of current console metrics to pinpoint the reason for an issue, and institute automatic remedial or corrective (fix) measures to address the current issue.

In an embodiment, the self-healing process 1210 performs four main steps of (1) detecting or identifying the issue, (2) analyzing the issue, (3) performing issue remediation, and (4) incorporating results back into the remediation knowledge database.

Figure 11:
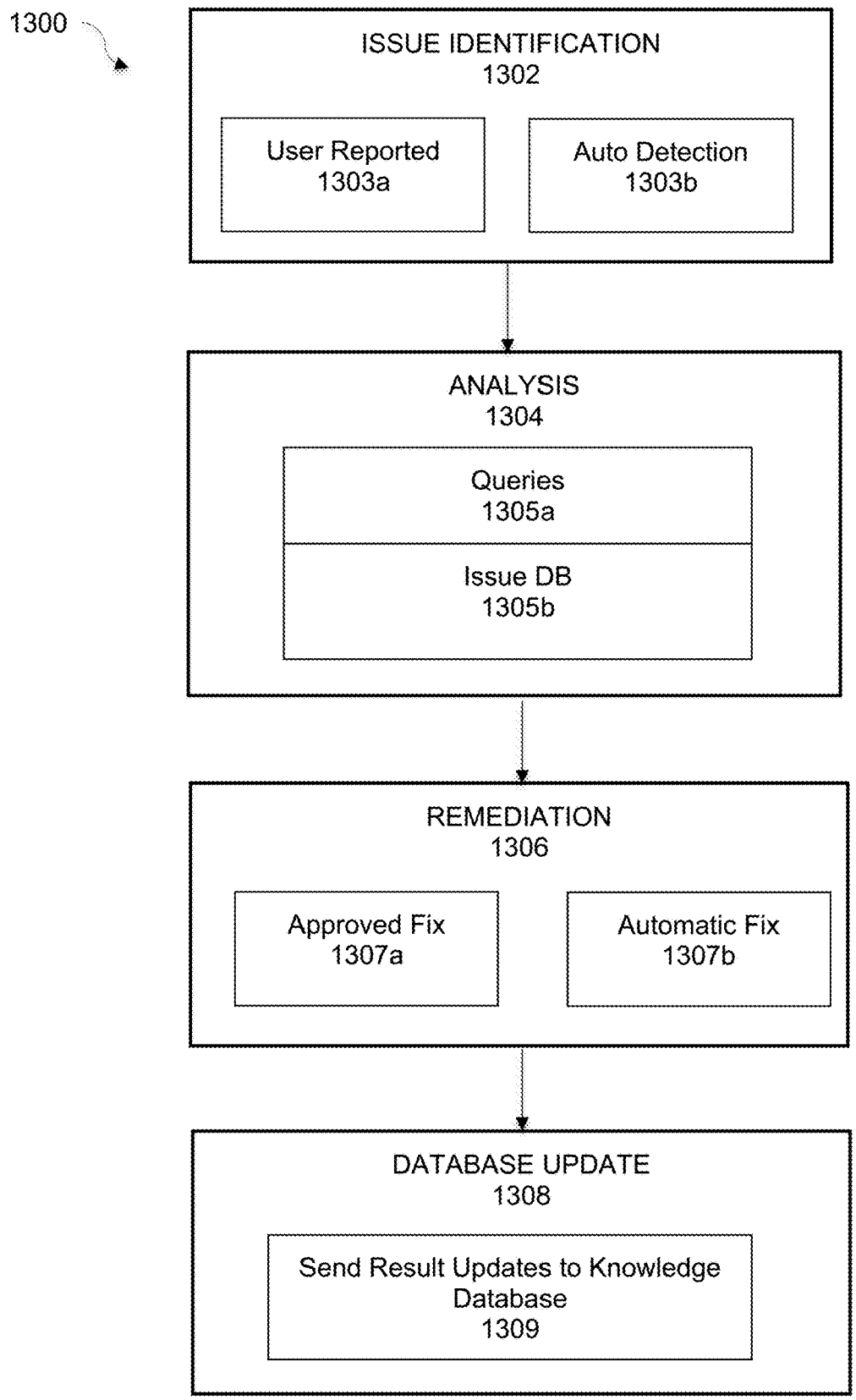
FIG. 11 is a diagram illustrating components and process flows for a self-healing component and process, under some embodiments.

FIG. 11 is a diagram illustrating components and process flows for a self-healing component and process, under some embodiments. As shown in diagram 1300, an initial step in the self-healing process is issue detection/identification, 1302. Generation of an issue triggers the self-healing process. There are two sub-methods of detecting an issue in a system. The first is a user-reported issue reporting, 1303a. During normal operation, a user at any time can report an issue through the console GUI. For example, the user could select or click a 'Submit an Issue' command, which would generate a list of possible known or previously reported problems. The user could then select the one most representative of their current issue (e.g., 'Restore backup stuck in verifying state'). Alternatively, the user could enter a textual description of the issue using certain keywords, and the system could be configured to recognized, pattern-match or utilize machine-learning methods to provide a closest match to the user input.

The second method of detecting an issue is through an automatic detection process 303b. In this case, the console could self-detect an issue when errors arise with system health and task completion. These automatically generated issues can be derived from logs, alerts, and system status events (e.g., a restore operation failed to run at the designated run time triggering error).

The automatic or user-reported condition would then trigger the self-healing tool to query the issue database through the analysis process 1304. Once the error or issue is detected (auto or user-reported) it is sent to the issue or remediation database. This second stage of processing is the analysis within the remediation database, in which the error is queried 305a against a database 1305b of known issues to find the best match of potential issues matching the detected issue. To further successfully match an issue, additional console metrics can be leveraged (e.g., error message IDs, logs, etc.) to provide a richer context of data to improve the identification of the appropriate fix. Using this metadata, a standard cluster analysis technique can be conducted to compare the new issue to issues already part of the remediation database. The strength of these comparisons would be used to determine which remediation measures are most strongly associated with this issue by their affinity percentage.

Figure 12:
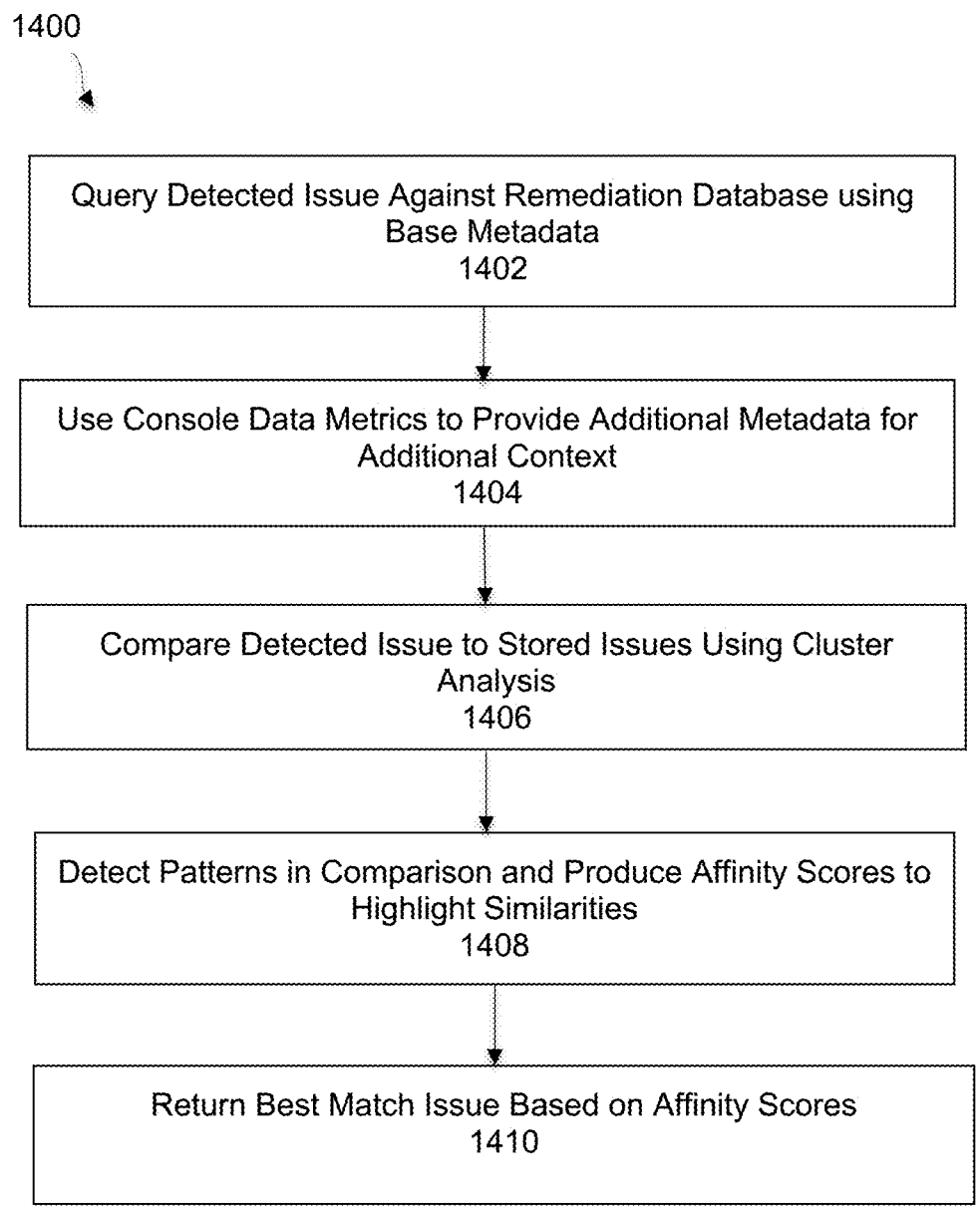
FIG. 12 is a flowchart that illustrates a method of analyzing detected issues in the analysis stage of a self-healing process, under some embodiments.

FIG. 12 is a more detailed flowchart illustrating a method of analyzing detected issues in the analysis stage 1304, under some embodiments. The analysis process 1400 begins with querying the detected issue against the remediation using a first set of metadata, such as derived by the initial issue description, 1402. The process then uses console data metrics, such as error codes, log entries, alerts, and so on, to define additional metadata that may provide further context to the issue, 1404. The detected issue as defined by the metadata is then compared to the known issues stored in the remediation database using cluster analysis, or similar methods, 406. The analysis process detects patterns in the issue metadata and creates affinity scores to highlights similarities to the existing known issues, 1408. The process then returns the best match or matches based on the affinity scores, 1410.

This overall analysis process 1400 effectively uses one or more sets of metadata to allow a large number of variables to be considered and updated for unique environments and error situations. Compared to present person-to-person methods, the metadata remediation associations are much quicker and typically more accurate as they benefit from being done automatically with little to no requirement for user engagement.

FIG. 13 is a table illustrating an illustrative case of issue affinity across multiple remediation plans, under an example embodiment. For the example of table 1500, assume that the detected issue is a restore backup failure. The metadata is taken from the console (e.g., error codes, logs, etc.) and compared to characteristics of known issues (e.g., protection storage issues, target destination issues, or backup file issues). In this example, the issue is manifested as a missing storage unit, such as if the backup command failed to specify the storage target. The analysis stage has returned three possible reasons and remediation options (A, B, and C) that indicate that the storage unit may be missing because of a typo in the command (no storage unit specified or unparseable), the storage unit is currently offline and not accessible, or the storage unit does not exist.

The analysis process selects the closest match by calculating affinity scores based on the metadata, and for the example shown, it can be seen that the detected issue is due to a typo in which the storage unit is missing or unrecognizable.

The database table (e.g., 1500) stores various items of information, such as issues 1502 and issue attributes 1504 for each of the issues. The overall affinity percentage is calculated by combining certain correlation factors, such as those illustrated in FIG. 13.

In an embodiment, the database table also stores steps to remedy the detected issue, such as in the form of scripts, macros, or command sequences. These are listed as solutions 1506 associated with each issue, and are used to implement the remediation performed in the remediation stage 1306 of FIG. 11. Thus, after the remediation knowledge base has identified the best possible solution to the detected issue, the next step will be to run the script or scripts that comprise the solution or corrective action.

As stated above, the remediation database has an entry for each remediation script that includes a list of attributes that the script affects. Each system has a list of attributes associated with each operation. When an operation fails, the system tries to find the best script to remediate the problem. It does so by computing an affinity score for each script, as described above. The affinity score is calculated by looking at the number of attributes associated with the operation and comparing those attributes with each script in the remediation database.

In an embodiment, the scripts are performed using the script execution process, for the API recorder 160 of FIG. 1, such as by using the macro playback process 621 of FIG. 6.

This method allows specific or previously defined tech support scripts to automatically substitute unique user information (e.g., System UUIDs) that automatically customize solutions for the user's environment. For example, this could be as simple as restarting a stalled job or more complex actions such as resetting an attribute before restarting a backup again. The API recorder allows tech support personnel to record a macro of the solution activities while also maintaining substitution variables that should be used at run time (e.g., asset ID).

As shown in FIG. 11, different types of remediation measures may be implemented, specifically, those that require approval and those that may be performed automatically. For example, less critical actions can usually be taken automatically, however solutions that are critical or drastic may require human awareness or approval. In this case, the system can notify the user with an option to implement the proposed solution (e.g., what worked last time and the option to initiate one of those options). An example of an action that would require human approval would be when a storage target is full, in which case, the solution may be to create more room by either a) running garbage collection and re-trying the backup, b) adding more storage, c) adjusting retention, or d) offloading some assets to another storage target. Some actions may be beyond the scope of the system administrator to implement (e.g., an operating system issue versus a backup issue). In such a case, the solution may be to direct the user to other personnel or provide documentation, and so on. This kind of solution might help mitigate the majority of solvable issues in a user environment, which will drive down tech support calls and increase customer satisfaction.

As further shown in FIG. 11, process 1300 includes a database update stage 1308 in which the fix applied in remediation 306 are sent to the remediation database as updates, 1309. The remediation database thus maintains outcome metrics on when fixes are tried and which ones have the best success rates and customer satisfaction. The items with the highest likelihood of success and correlation index will be more highly weighted to use in customer environments. This can be seen in FIG. 13, as a list of remediation actions in the failed Restore example. For this embodiment, each attempt to fix an issue is recorded by the system whether the fix was successful or unsuccessful (if a fix possible), along with the number of times this issue was detected. This tracking is useful to maintain quality control over the system and modify the algorithms when necessary to improve success rates.

In addition users can be requested to provide survey results to submit their satisfaction with and comments/notes for each fix (the number of these submitted shall also be recorded for context). These subjective ratings and clarifications on usage will help pinpoint fixes that need additional fine-tuning. In FIG. 13, this embodiment is illustrated in the row labeled 'Success % with this Issue' for a success percentage and user satisfaction scores. The purpose of tracking success metrics is to allow future users/systems that have the same issue to apply the same fix with the highest percentage of likelihood of fixing the issue.

Figure 14:
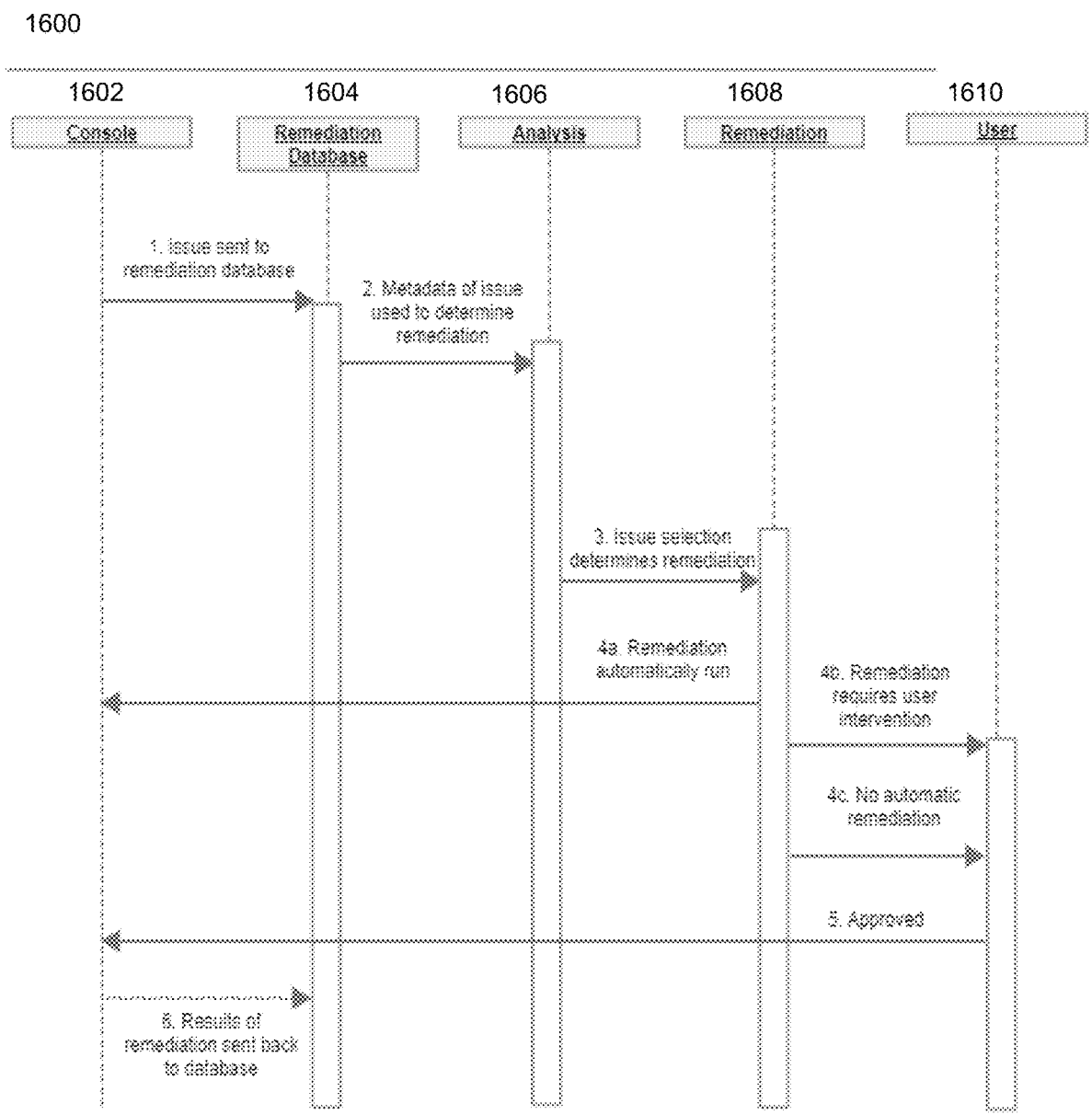
FIG. 14 is a diagram illustrating process flows among components in the self-healing process, under some embodiments.
Figure 15:
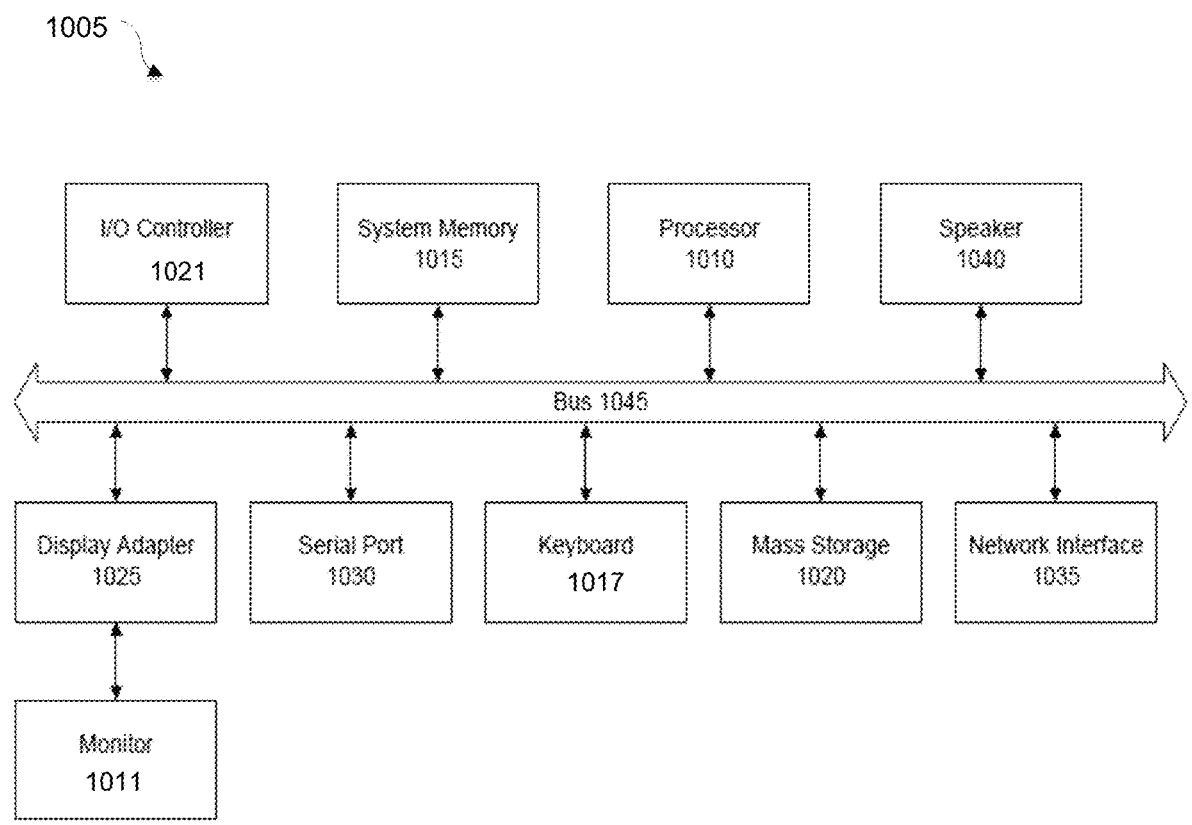
FIG. 15 is a block diagram of a computer system used to execute one or more software components of the script/macro recorder process, under some embodiments.

FIG. 14 is a diagram illustrating process flows among components in the self-healing process, under some embodiments. As shown in FIG. 14, the system 1600 includes a console 1602, a remediation database 1604, an analysis component 1606, a remediation component 1608, and the user 1610. The process starts (1) with the issue sent from the console 1602 to the remediation database 1604. The metadata of the issue is used to determine the remediation solution (2) by the analysis component 1606, and the issue selection determines the remediation (3) 1608. If the remediation can be automatically run, it is (4a), otherwise it is deemed to require user 1610 intervention (4b). If there is no remediation (4c) the user is notified. Upon approval of user intervention required measures, the remediation is run (5) and results are then sent back (6) to the remediation database (1604).

Embodiments described herein thus accurately and securely record and playback built-in APIs used during the execution of custom workflows. This enables users to easily reuse and share these recorded workflows (macros) without the need to manually re-execute multiple steps. Embodiments also provide a way by which recorded macros can be analyzed by vendors or system administrators for certain operational purposes, such as software product development and improvement. Software product vendors may analyze public macros in order to understand repetitive workflows and potentially add core capabilities or find new features that can be offered to their customers.

Embodiments of the processes and techniques described above can be implemented on any appropriate backup system operating environment or file system, or network server system. Such embodiments may include other or alternative data structures or definitions as needed or appropriate. The processes described herein may be implemented as computer programs executed in a computer or networked processing device and may be written in any appropriate language using any appropriate software routines. For purposes of illustration, certain programming examples are provided herein, but are not intended to limit any possible embodiments of their respective processes.

The system of FIG. 1 may comprise any number of individual client-server networks coupled over the Internet or similar large-scale network or portion thereof. Each node in the network(s) comprises a computing device capable of executing software code to perform the processing steps described herein. FIG. 9 shows a system block diagram of a computer system used to execute one or more software components of the systems and methods described herein. The computer system 1005 includes a monitor 1011, keyboard 1017, and mass storage devices 1020. Computer system 1005 further includes subsystems such as central processor 1010, system memory 1015, I/O controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system 1005 may be one of the Microsoft Windows®. family of systems (e.g., Windows Server), Linux, Mac OS X, IRIX32, or IRIX64. Other operating systems may be used. Microsoft Windows is a trademark of Microsoft Corporation.

The computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, among other examples), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of recording and playing back command scripts for correcting issues in a data protection system, comprising:
storing, in a remediation database, scripts comprising command sequences correcting one or more issues previously encountered in the data protection system;
analyzing metadata associated with a present issue of the data protection system;
selecting a script from among the stored scripts to correct the present issue, wherein the issues comprise at least one of: a problem associated with identifying a data asset to be backed up, a problem associated with identifying a storage target to store backed up data, a problem associated with a source of the data to be backed up, or a problem associated with a backup or restore command operating on the data asset to be backed up; and
allowing automated playback of the selected script by the data protection system, wherein the metadata provides appropriate values for a current execution of the selected script, wherein the metadata comprises initial metadata describing at least one of the data source, storage target, or data asset, and further comprises second metadata for backup console metrics including error messages, device and asset identifiers, and log entries for previous issues, and further wherein the initial and second metadata are used to select the script from among the stored scripts to correct the present issue, and further wherein the selected script substitutes one or more parameters specifying information unique to the data protection system into an application program interface (API) recording and playback process.

2. The method of claim 1 wherein the present issue comprises at least one of: specifying a non-existent device, specifying a non-accessible device, attempting execution of a non-existent command, or specifying a mis-typed command.

3. The method of claim 1 wherein the API recording and playback process comprises:
capturing all API function calls of one or more APIs of a target product sequence upon initiation of a recording operation by a user;
storing a recorded macro in a macro store;
generating, in response to a user request to playback the recorded macro, a call graph defining an execution sequence of one or more APIs of the recorded macro;
prompting the user to input any missing or required API values; and
executing the recorded macro using the call graph and user input values.

4. The method of claim 3 wherein the call graph comprises calls between the one or more APIs that depend upon inputs which are derived from one or more outputs of the higher level API calls in a hierarchy, and wherein the call graph further comprises a set of connected vertices, wherein all the edges are directed from one vertex to another, each graph vertex describes each function call while each graph edge describes how to map output data from a parent API call to input data into each subsequent API call, and further wherein inputs for APIs subsequent to the root API are determined using current state inputs to each API, or a walk back through earlier APIs using the call graph.

5. The method of claim 1 wherein the present issue is identified by one of a user entry of an encountered problem, or automatic detection of the encountered problem by an issue detection process.

6. A method of remedying problems in a data protection system, comprising:
detecting a current problem occurring while processing a dataset operated on by the data protection system;
deriving attributes associated with a present operation causing the current problem from metadata associated with data assets and data processing components processing the dataset;
comparing the derived attributes with attributes stored in a remediation database for previous problems encountered in the data protection system, wherein the attributes are provided as part of a command execution script;
determining a most closely matching script from the mediation database for the current problem based on a comparison of respective attributes; and
executing the most closely matching script in a command execution process.

7. The method of claim 6 further comprising associating a list of attributes with each of the present operation and past operations causing the previous problems, and wherein the remediation database stores an entry for each remediation script that includes a list of attributes that the respective script affects.

8. The method of claim 7 further comprising:
comparing respective attributes of the present operation against scripts for each of the past operations;
calculating an affinity score for each of the past operations based on a number of matching attributes in the comparing step; and
selecting a script with the highest affinity score to be the most closely matching script.

9. The method of claim 6 wherein the current and previous problems comprise at least one of: a problem associated with identifying a data asset to be backed up, a problem associated with identifying a storage target to store backed up data, a problem associated with a source of the data to be backed up, or a problem associated with a backup or restore command operating on the data asset to be backed up, and further wherein the current problem comprises at least one of: specifying a non-existent device, specifying a non-accessible device, attempting execution of a non-existent command, or specifying a mis-typed command.

10. A method of recording and playing back issue remediation scripts in an application program interface (API) recording and playback process in a data protection system, comprising:
capturing all API function calls of one or more APIs of a target product sequence upon initiation of a recording operation by a user;
storing a recorded macro in a macro store;

generating, in response to a user request to playback the recorded macro, a call graph defining an execution sequence of one or more APIs of the recorded macro;

storing, in a remediation database, scripts comprising command sequences correcting one or more issues previously encountered in the data protection system;

selecting a script from among the stored scripts to correct a present issue;

substituting one or more parameters specifying information unique to the data protection system in place of the API function calls; and allowing automated playback of the selected script by the data protection system.

11. The method of claim 10 wherein the one or more parameters comprise identifiers for at least one of: datasets to be protected, and devices sourcing or storing the datasets to be protected.

12. The method of claim 11 wherein the one or more issues comprise at least one of: a problem associated with identifying a data asset to be backed up, a problem associated with identifying a storage target to store backed up data, a problem associated with a source of the data to be backed up, or a problem associated with a backup or restore command operating on the data asset to be backed up.

13. The method of claim 12 wherein the present issue is identified by one of: an automated issue detection process or user specified issue, and wherein the present issue comprises at least one of: specifying a non-existent device, specifying a non-accessible device, attempting execution of a non-existent command, or specifying a mis-typed command.

14. The method of claim 11 wherein the selecting step comprises utilizing metadata including metadata describing at least one of the data source, storage target, or data asset, and metadata for backup console metrics including error messages, device and asset identifiers, and log entries for previous issues.

15. The method of claim 14 wherein the selecting step comprises using cluster analysis to compare the present issue to the one or more previously encountered issues stored in the remediation database.

* * * * *